United States Patent [19]
Crabb

[11] Patent Number: 6,027,185
[45] Date of Patent: Feb. 22, 2000

[54] RECOIL AND SLACK ADJUSTMENT MECHANISM FOR AN ENDLESS TRACK CHAIN OF AN UNDERCARRIAGE ASSEMBLY

[75] Inventor: Elmer R. Crabb, Granbury, Tex.

[73] Assignee: Caterpillar Inc., Peoria, Ill.

[21] Appl. No.: 08/993,207

[22] Filed: Dec. 18, 1997

[51] Int. Cl.[7] .................................................. B62D 55/00
[52] U.S. Cl. ........................ 305/148; 305/149; 305/135; 305/143; 305/144; 305/145; 91/4 R
[58] Field of Search ..................... 305/143, 144, 305/145, 148, 149, 135; 91/4 R

[56] References Cited

U.S. PATENT DOCUMENTS

| | | | |
|---|---|---|---|
| 2,811,397 | 10/1957 | Cline | 305/145 |
| 3,415,159 | 12/1968 | Hornlein et al. | 91/4 R |
| 3,549,213 | 12/1970 | Smith et al. | 305/149 |
| 3,645,586 | 2/1972 | Piepho | 305/146 |
| 3,792,910 | 2/1974 | Kaufman et al. | 305/10 |
| 3,912,335 | 10/1975 | Fisher | 305/148 |
| 4,227,748 | 10/1980 | Meisel, Jr. | 305/144 |
| 4,457,564 | 7/1984 | Ruge et al. | 305/10 |
| 4,681,376 | 7/1987 | Riml | 305/149 |
| 4,840,437 | 6/1989 | Henry et al. | 305/144 |
| 4,854,650 | 8/1989 | Getz et al. | 305/10 |
| 4,859,006 | 8/1989 | Philippe et al. | 305/10 |
| 4,881,786 | 11/1989 | Tonsor | 305/153 |
| 5,191,951 | 3/1993 | Bargfrede et al. | 180/9.1 |
| 5,293,948 | 3/1994 | Crabb | 180/9.1 |
| 5,334,106 | 8/1994 | Purcell | 305/145 |
| 5,409,305 | 4/1995 | Nagorcka | 305/21 |

*Primary Examiner*—D. Glenn Dayoan
*Assistant Examiner*—Long Bao Nguyen
*Attorney, Agent, or Firm*—Paul J. Maginot; Kevin M. Kercher

[57] ABSTRACT

A recoil and slack adjustment mechanism for tensioning an endless track chain of an undercarriage assembly of a work machine includes a ram assembly and an accumulator assembly. The ram assembly includes a ram housing having a ram chamber defined therein. A recoil ram is movably housed within the ram chamber. The recoil ram has a ram subchamber defined therein. The tensioning ram is movably housed within the ram subchamber and is coupled to a front idler roller of the undercarriage assembly. A check valve is disposed between the ram chamber and the ram subchamber such that fluid pressure from the accumulator assembly is selectively exerted on the tensioning ram thereby urging the front idler roller so as to bias the track chain of the undercarriage assembly. The recoil and slack adjustment assembly provides continuous, constant tensioning of the track chain, and does not require the use of live hydraulics.

20 Claims, 4 Drawing Sheets

RECOIL AND SLACK ADJUSTMENT MECHANISM FOR AN ENDLESS TRACK CHAIN OF AN UNDERCARRIAGE ASSEMBLY

TECHNICAL FIELD OF THE INVENTION

The present invention relates generally to an undercarriage assembly of a work machine, and more particularly to a recoil and slack adjustment mechanism for an endless track chain of an undercarriage assembly.

BACKGROUND OF THE INVENTION

A work machine, such as a track-type work machine, is typically supported and propelled by an undercarriage assembly which includes an endless track chain having a plurality of interconnected articulating components or links. The undercarriage assembly further includes a drive sprocket, a front idler roller, and a rear idler roller, around each of which the track chain is advanced.

In order to create the tension necessary to keep the track chain from derailing from the drive sprocket and the idler rollers, a slack adjustment mechanism such as a coiled spring is often used. In particular, the coiled spring urges the front idler roller in a direction away from the rear idler roller thereby creating tension on the track chain. Over a period of time, a number of the components associated with the undercarriage assembly, such as the track chain and the idler rollers, begin to wear thereby creating slack in the track chain. In order to remove the slack from the track chain, it is necessary to increase the tension of the track chain. Such an increase in the tension is generally accomplished by manually injecting or otherwise inserting a material, such as grease, into the slack adjustment mechanism associated with the undercarriage assembly.

The use of such slack adjustment mechanisms has a number of drawbacks associated therewith. For example, manual injection of grease into the slack adjustment mechanism may be a laborious task thereby decreasing the efficiency associated with the work machine. Moreover, the endless track chain may inadvertently be operated for a period of time with slack therein. This is true since the endless track chain may be operated with slack therein from the point in time in which slack is first introduced into the endless track chain until the point in time in which the tension is manually increased. It should be appreciated that operation of the undercarriage assembly with slack present in the endless track chain increases the rate at which components associated with the undercarriage assembly wear thereby potentially reducing the useful life of the undercarriage assembly.

In addition, a number of slack adjustment mechanisms have heretofore been designed which utilize hydraulic components to maintain tension on the track chain. However, such slack adjustment mechanisms typically require constant fluid pressure from a hydraulic pump associated with the work machine thereby disadvantageously reducing the work machine's hydraulic capacity for performing work operations such as earth moving and ripping.

What is needed therefore is a recoil and slack adjustment mechanism which overcomes one or more of the above-mentioned drawbacks.

DISCLOSURE OF THE INVENTION

In accordance with a first embodiment of the present invention, there is provided a slack adjustment mechanism for a track of an undercarriage assembly. The mechanism includes a ram assembly which includes a ram housing defining a ram chamber. The ram housing further has a ram fluid port defined therein. The ram assembly also includes a first ram positioned within the ram chamber. The first ram defines a ram subchamber. The first ram has a ram opening defined therein so as to enable fluid communication between the ram chamber and the ram subchamber. The ram assembly further includes a second ram positioned within the ram subchamber. Moreover, the ram assembly includes a check valve interposed between the ram chamber and the ram subchamber for controlling fluid flow therebetween. The mechanism also includes an accumulator assembly which includes an accumulator housing defining an accumulator chamber. The accumulator housing further has an accumulator fluid port defined therein. The accumulator fluid port is positioned relative to the ram fluid port so that the ram chamber is in fluid communication with the accumulator chamber. The accumulator assembly further includes an accumulator piston positioned within the accumulator chamber so as to divide the accumulator housing into a first accumulator subchamber and a second accumulator subchamber. Moreover, the accumulator assembly includes a gas positioned within the first accumulator subchamber. The accumulator assembly yet further includes a fluid positioned within the second accumulator subchamber.

In accordance with a second embodiment of the present invention, there is provided a slack adjustment mechanism for a track of an undercarriage assembly. The mechanism includes a ram assembly which includes a ram housing defining a ram chamber. The ram housing further has a ram fluid port defined therein. The ram assembly further includes a first ram positioned within the ram chamber. The first ram defining a ram subchamber. The first ram having (i) a ram opening defined therein so as to enable fluid communication between the ram chamber and the ram subchamber, and (ii) a first ram head having a first ram leading surface defined thereon which contacts fluid within the ram chamber. The ram assembly further includes a second ram positioned within the ram subchamber. The second ram includes a second ram head having a second ram leading surface defined thereon which contacts fluid within the ram subchamber. The first ram leading surface is larger than the second ram leading surface. The ram assembly yet further includes a check valve interposed between the ram chamber and the ram subchamber for controlling fluid flow therebetween. The mechanism also includes an accumulator assembly which includes an accumulator housing defining an accumulator chamber. The accumulator housing further having an accumulator fluid port defined therein. The accumulator fluid port is positioned relative to the ram fluid port so that the ram chamber is in fluid communication with the accumulator chamber. The accumulator assembly further includes an accumulator piston positioned within the accumulator chamber so as to divide the accumulator housing into a first accumulator subchamber and a second accumulator subchamber. The accumulator assembly further includes a gas positioned within the first accumulator subchamber. Moreover, the accumulator assembly includes a fluid positioned within the second accumulator subchamber. The undercarriage assembly includes a first idler roller, a second idler roller, and a drive sprocket. The track is entrained about the first idler roller, the second idler roller, and the drive sprocket. The ram assembly and the accumulator assembly cooperate so as to adjust spacing between the first idler roller and the second idler roller.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
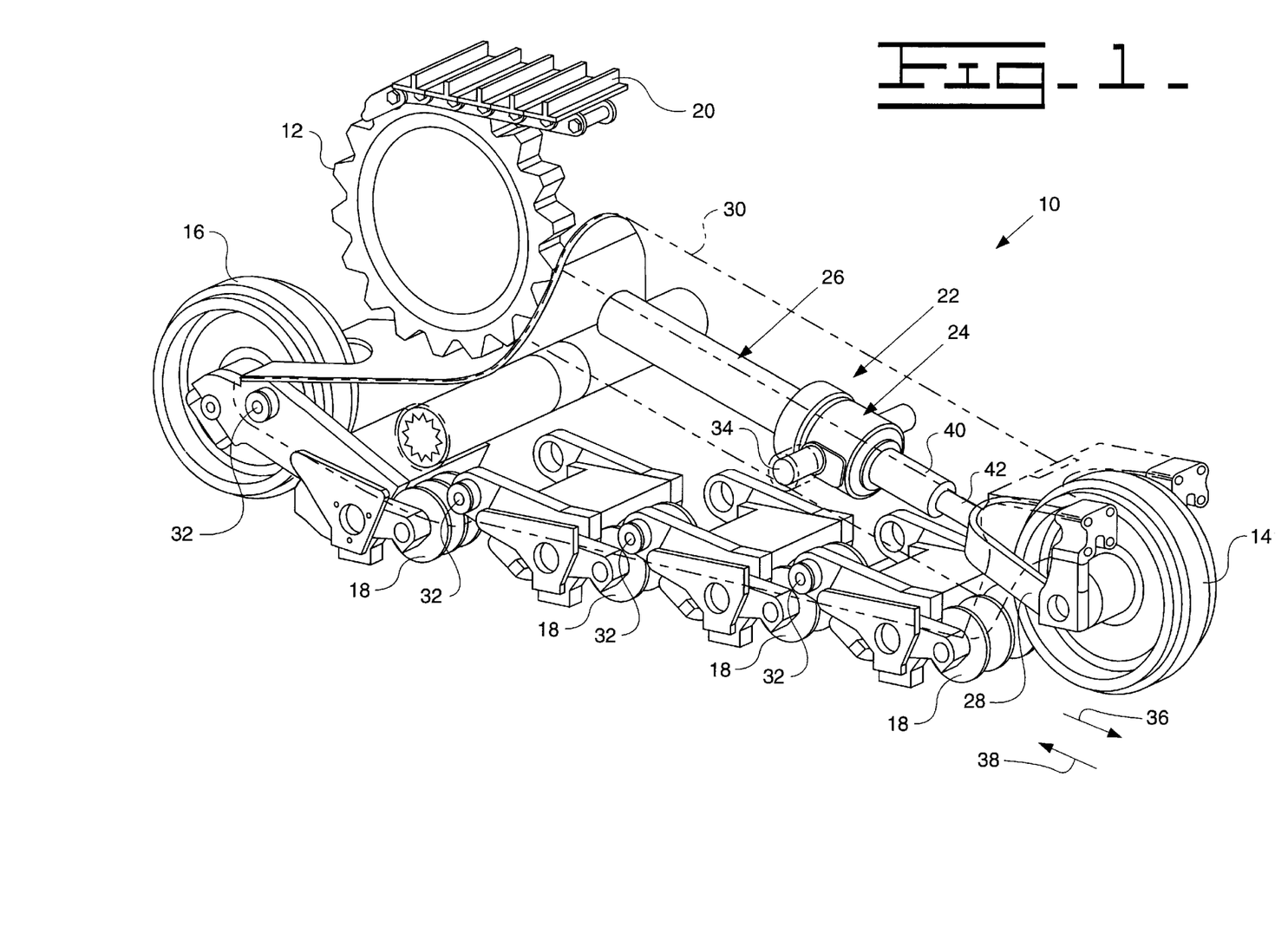
FIG. 1 is a perspective view of an undercarriage assembly which incorporates the features of the present invention therein (note that the structural member 30 is shown in phantom for clarity of description)

Referring now to FIG. 1, there is shown an undercarriage assembly 10 for use on a work machine such as a track-type work machine (not shown). The undercarriage 10 includes a drive sprocket 12, a front idler roller 14, a rear idler roller 16, and a number of midroller assemblies 18. An endless track chain 20 is driven by the drive sprocket 12 so as to be advanced around each of the front idler roller 14, the rear idler roller 16, and the midroller assemblies 18 thereby providing the motive power for the work machine.

The undercarriage assembly 10 also includes a recoil and slack adjustment mechanism 22 which is operatively coupled to the front idler roller 14. In particular, the recoil and slack adjustment mechanism 22 includes a ram assembly 24 and an accumulator assembly 26. A first end of the ram assembly 24 is coupled to a fork member 28 which is in turn coupled to the front idler roller 14, whereas a second end of the ram assembly is coupled to the accumulator assembly 26. The ram assembly 24 allows the front idler roller 14 to be moved relative the rear idler roller 16 thereby maintaining tension on the track chain 20. In particular, the undercarriage assembly 10 further includes a structural member 30. As shown in FIG. 1, the rear idler roller 16 and the midroller assemblies 18 are secured to the structural member 30 by a number of mounting pins 32, whereas the recoil and slack adjustment mechanism 22 is secured to the structural member 30 by a pair of mounting pins 34. Therefore, as the ram assembly 24 urges the idler roller 14 in the general direction of arrow 36 of FIG. 1, the front idler roller 14 is moved relative the structural member 30 and hence the rear idler roller 16. In particular, as the ram assembly 24 urges the front idler roller 14 in the general direction of arrow 36, the distance between the front idler roller 14 and the rear idler roller 16 is increased thereby increasing tension (i.e. reducing slack) on the track chain 20.

Figure 2:
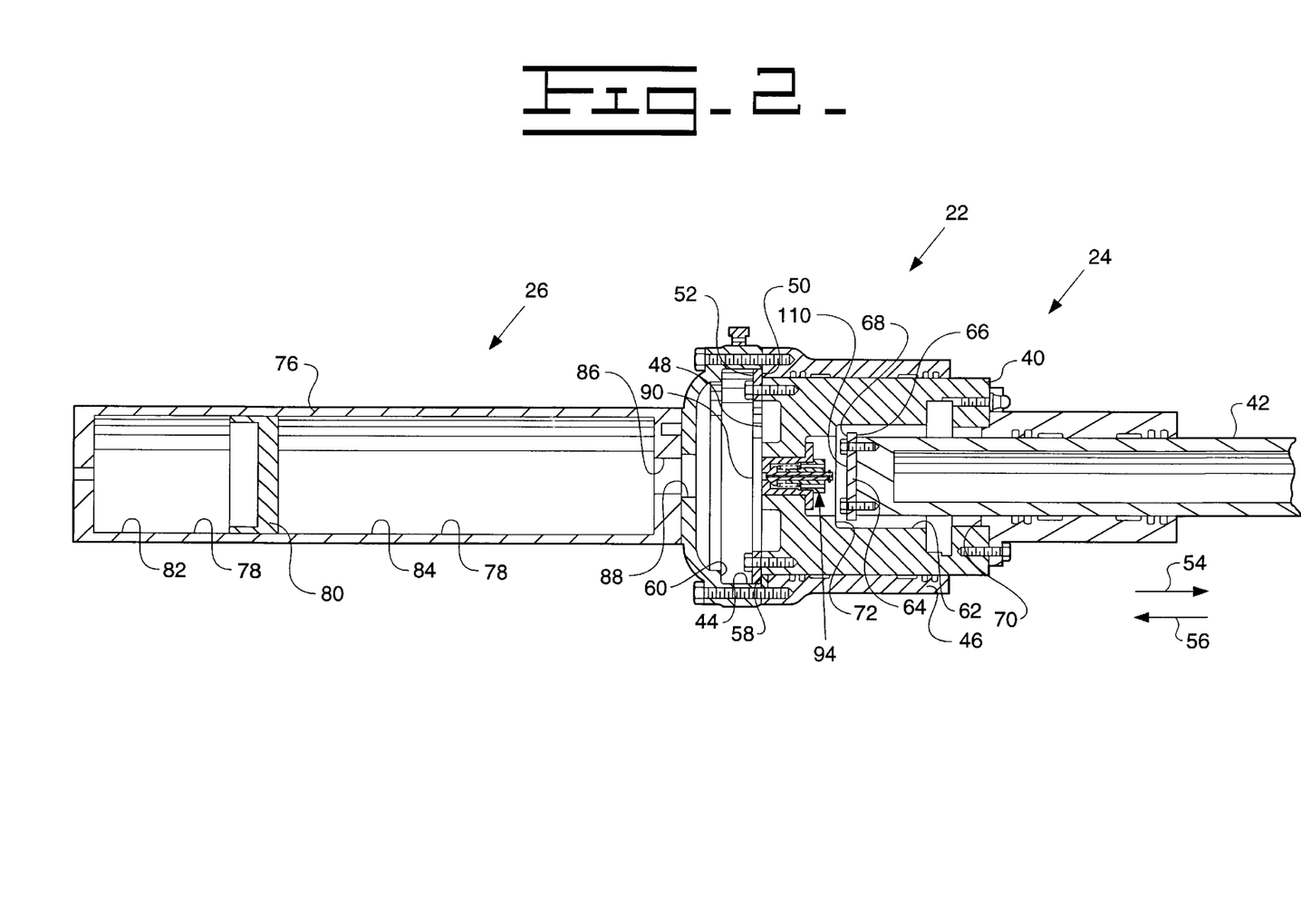
FIG. 2 is a cross sectional view of the recoil and slack adjustment mechanism of the undercarriage assembly of FIG. 1 (note that a number of components associated with the recoil and slack adjustment mechanism are not shown in cross section for clarity of description)
Figure 3:
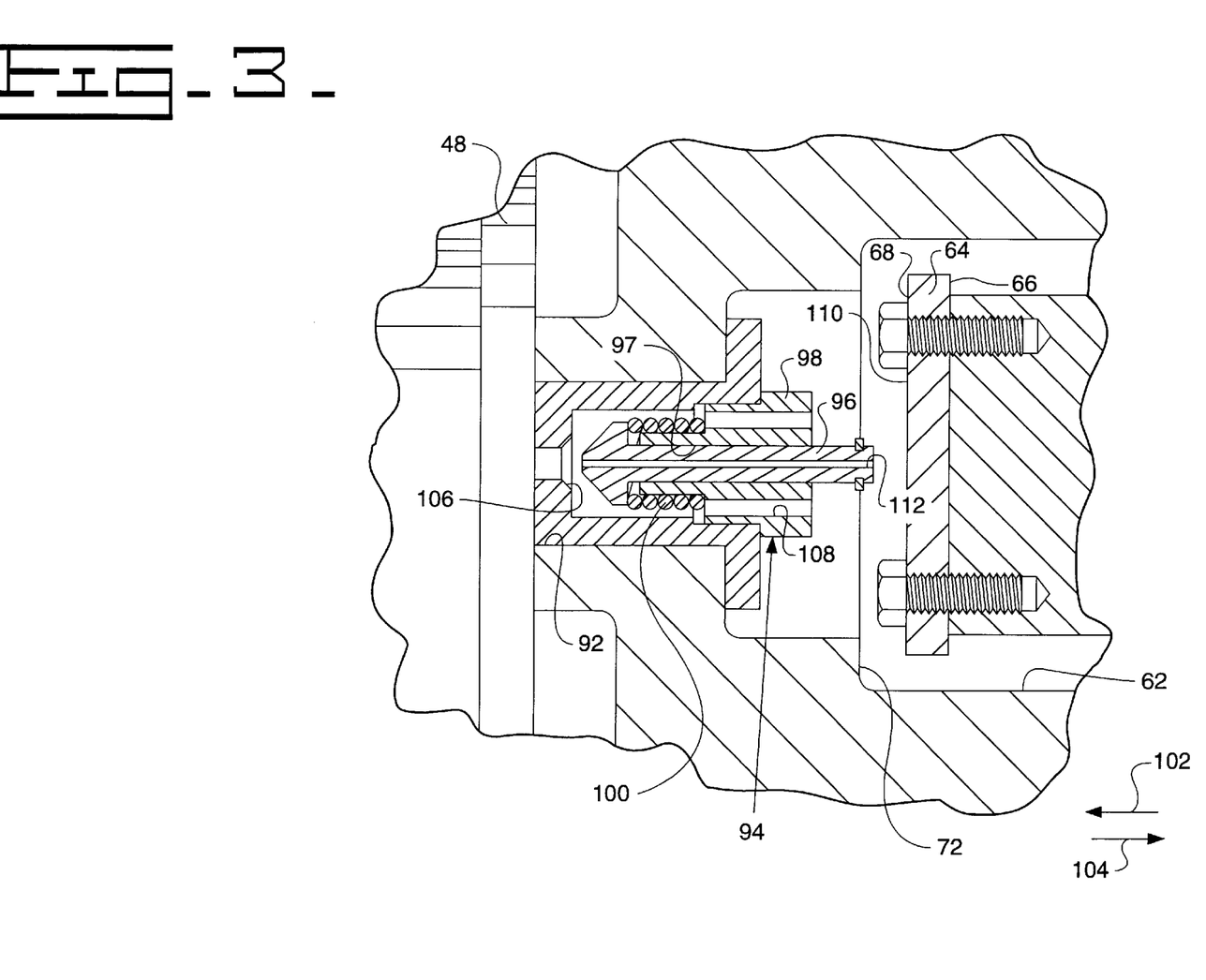
FIG. 3 is an enlarged fragmentary cross sectional view of the recoil and slack adjustment mechanism of the undercarriage assembly of FIG. 1 which shows the check valve assembly positioned in the open position.
Figure 4:
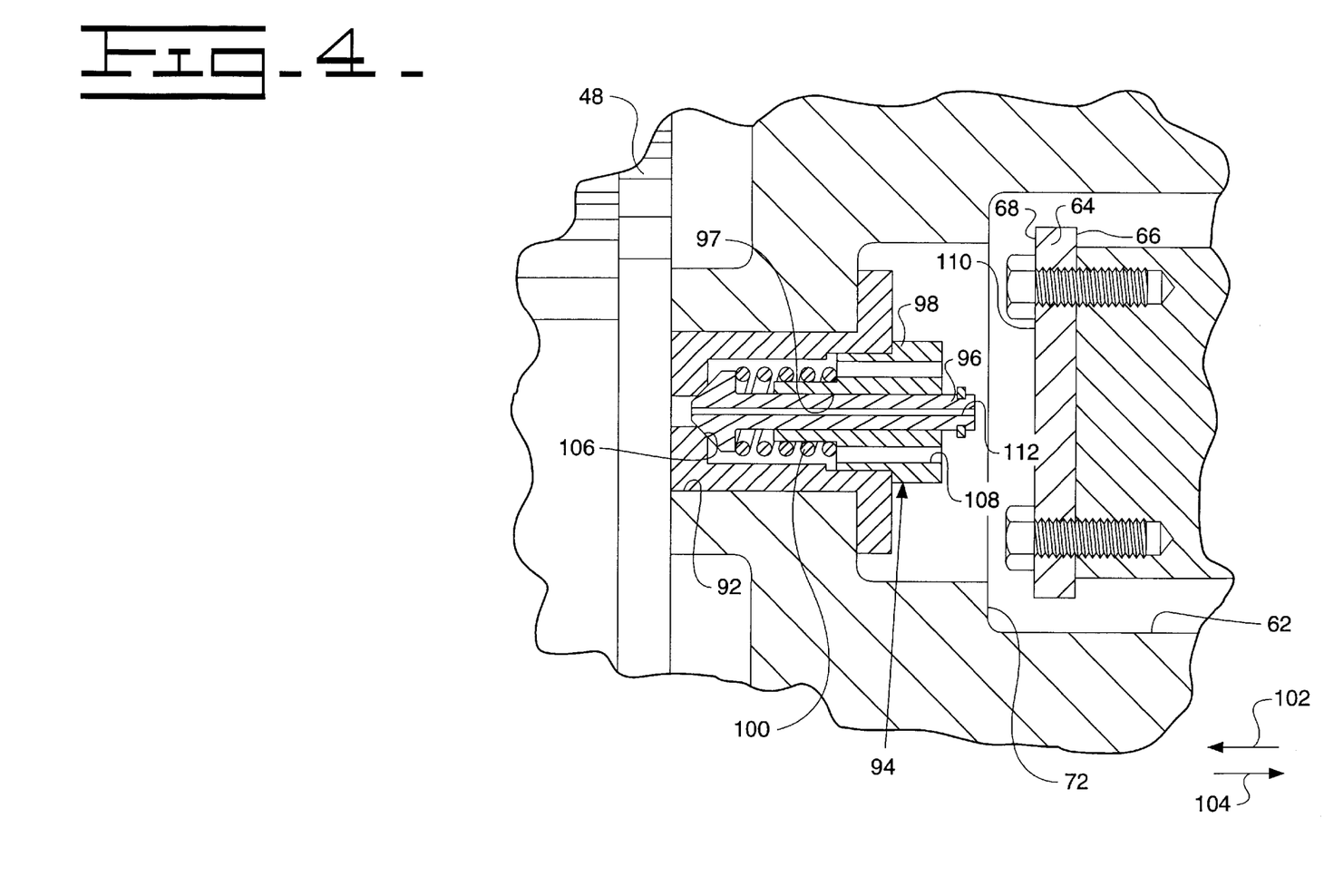
FIG. 4 is a view similar to FIG. 3, but showing the check valve assembly positioned in the closed position.

Referring now to FIGS. 2–4, there is shown the recoil and slack adjustment assembly 22 in more detail. The ram assembly 24 includes a first or recoil ram 40 and second or tensioning ram 42. The recoil ram 40 is movably housed within a ram chamber 44 defined in a recoil ram housing 46. Moreover, the recoil ram 40 includes a ram head 48 having a pair of shoulders 50, 52 defined therein. As the recoil ram 40 is advanced or otherwise urged in the general direction of arrow 54 of FIG. 2, the shoulder 50 contacts a stop surface 58 defined in the ram housing 46 thereby preventing further advancement thereof in the general direction of arrow 54. Similarly, as the recoil ram 40 is advanced or otherwise urged in the general direction of arrow 56 of FIG. 2, the shoulder 52 contacts a stop surface 60 defined in the ram housing 46 thereby preventing further advancement thereof in the general direction of arrow 56.

The recoil ram 40 has a ram subchamber 62 defined therein. As shown if FIG. 2, the tensioning ram 42 is movably housed within the ram subchamber 62. Moreover, the tensioning ram 42 includes a ram head 64 having a pair of shoulders 66, 68 defined therein. As the tensioning ram 42 is advanced or otherwise urged in the general direction of arrow 54 of FIG. 2, the shoulder 66 contacts a stop surface 70 defined in the ram housing 46 thereby preventing further advancement thereof in the general direction of arrow 54. Similarly, as the tensioning ram 42 is advanced or otherwise urged in the general direction of arrow 56 of FIG. 2, the shoulder 68 contacts a stop surface 72 defined in the ram housing 46 thereby preventing further advancement thereof in the general direction of arrow 56.

The accumulator assembly 26 is in fluid communication with both the ram chamber 44 and the ram subchamber 62. In particular, the accumulator assembly 26 includes a housing 76 which defines an accumulator chamber 78. A piston 80 is operatively housed within the accumulator chamber 78 thereby dividing the accumulator chamber 78 into a gas accumulator subchamber 82 and an oil accumulator subchamber 84. The gas accumulator subchamber is filled with a pressurized gas, such as nitrogen, whereas a fluid, such as hydraulic oil, is positioned in the oil accumulator subchamber 84.

The accumulator housing 76 has an accumulator fluid port 86 defined therein. As shown in FIG. 2, the accumulator fluid port 86 is positioned relative to a ram fluid port 88 defined in the ram housing 46 thereby placing the oil accumulator subchamber 84 in fluid communication with the ram chamber 44. Hence, fluid pressure within the oil accumulator subchamber 84 and the ram chamber 44 is exerted on a leading surface 90 of the ram head 48 thereby urging the ram head 48 and hence the recoil ram 40 in the general direction of arrow 54 of FIG. 2. It should be appreciated that the magnitude of the fluid pressure which is exerted upon the ram head 48 is dependent on the magnitude of the gas pressure within the gas accumulator subchamber 82. In particular, as the magnitude of the gas pressure within the gas accumulator subchamber 82 increases, the fluid pressure exerted on the ram head 48 by the hydraulic oil within the oil accumulator subchamber 84 and the ram chamber 44 likewise increases. It should be further appreciated that the gas within the gas accumulator subchamber 82 may be pre-charged (i.e. compressed) until the magnitude of the fluid pressure within the oil accumulator subchamber 84 reaches a predetermined magnitude in order to position the recoil ram 40 such that the shoulder 50 thereof is urged into contact with the stop surface 58. For example, the gas within the gas accumulator subchamber 82 may be pre-charged such that the fluid pressure of the hydraulic oil within oil accumulator subchamber 84 and hence the ram subchamber 44 has a magnitude of 663 pounds per square inch (psi). Such a fluid pressure exerted on the leading surface 90 of the ram head 48 allows the recoil ram 40 to exert a force of approximately 75,000 pounds in the general direction of arrow 54 of FIG. 2.

As alluded to above, the oil accumulator subchamber 84 is also in fluid communication with the ram subchamber 62.

In particular, the recoil ram 40 further has an opening 92 defined therein thereby placing the ram chamber 44 and hence the oil accumulator subchamber 84 in fluid communication with the ram subchamber 62.

The ram assembly 24 further includes a check valve 94 positioned in the opening 92 so as to control the flow of hydraulic oil between the ram chamber 44 and the ram subchamber 62. In particular, as shown in FIGS. 3 and 4, the check valve 94 includes a valve member 96 positioned within a valve chamber 97 defined in a valve housing 98. A valve spring 100 is concentrically mounted on the valve member 96 so as to urge the valve member 96 in the general direction of arrow 102 of FIGS. 3 and 4 thereby causing the valve member 96 to seat or otherwise be urged into contact with a valve seat 106 defined in the valve housing 98 (see FIG. 3). However, fluid pressure (e.g. 663 psi) within the ram chamber 44 is greater in magnitude than the spring bias generated by the valve spring 100 thereby positioning the check valve 94 in an open position as shown in FIG. 4. In particular, the fluid pressure (e.g. 663 psi) present in the ram chamber 44 causes the valve member 96 to be urged in the general direction of arrow 104 of FIGS. 3 and 4 thereby causing the valve member 96 to unseat or otherwise be spaced apart from the valve seat 106. It should be appreciated that when the valve member 96 is unseated from the valve seat 106, hydraulic oil may be advanced between the ram chamber 44 and the ram subchamber 62 via a number of flow channels 108 defined in the valve housing 98, as shown in FIGS. 3 and 4.

When the check valve 94 is positioned in its open position (i.e. hydraulic oil is able to be advanced from the ram chamber 44 to the ram subchamber 62 via the flow channels 108), fluid pressure present in the oil accumulator subchamber 84 is exerted on a leading surface 110 of the ram head 64 thereby urging the ram head 64 and hence the tensioning ram 42 in the general direction of arrow 54 of FIG. 2. It should be appreciated that the magnitude of the fluid pressure which is exerted upon the ram head 64 is dependent on the magnitude of the fluid pressure within the oil accumulator subchamber 84 and the ram chamber 44. For example, if the fluid pressure of the hydraulic oil within oil accumulator subchamber 84 and hence the ram subchamber 44 has a magnitude of 663 pounds per square inch (psi), the fluid pressure exerted on the leading surface 110 of the ram head 64 causes the tensioning ram 42 to exert a force of approximately 10,500 pounds in the general direction of arrow 54 of FIG. 2. It should be appreciated that such a force in the general direction of arrow 54 causes the front idler roller 14 to be urged in the general direction of arrow 36 of FIG. 1 thereby increasing the distance between the front idler roller 14 and the rear idler roller 16 which in turn tensions (i.e. removes the slack from) the track chain 20.

If a rock or the like is ingested by the undercarriage assembly 10 during advancement thereof, the front idler roller 14 is urged or otherwise moved in the general direction of arrow 38 of FIG. 1. Such movement of the front idler roller 14 causes the tensioning ram 42 to be urged in the general direction of arrow 56 of FIG. 2 thereby increasing fluid pressure in the ram subchamber 62. Such an increase in fluid pressure causes the check valve 94 to assume a closed position, as shown in FIG. 4. When positioned in its closed position, the check valve 94 prevents hydraulic oil from advancing between the ram subchamber 62 and the ram chamber 44 via the flow channels 108. Hence, the force being exerted on the front idler roller 14 is transferred to the recoil ram 40. Once such a force is greater in magnitude than the force created by fluid pressure exerted on the leading surface 90 of the ram head 48 (e.g. 75,000 pounds), the recoil ram 40 is urged or otherwise moved in the general direction of arrow 56 of FIG. 2 thereby providing relief or slack in the track chain 20. It should be appreciated that such relief in the track chain 20 facilitates expulsion of the rock from the undercarriage assembly 10.

As the recoil ram 40 is urged in the general direction of arrow 56 of FIG. 2, hydraulic oil in the ram chamber 44 is displaced or otherwise forced into the oil accumulator subchamber 84 thereby increasing fluid pressure therein. Such an increase in fluid pressure urges the piston 80 in the general direction of arrow 56 thereby compressing the gas in the gas accumulator subchamber 82. Once the rock has be expelled from the undercarriage assembly 10, gas pressure present in the gas accumulator subchamber 82 urges the piston 80 in the general direction of arrow 54 of FIG. 2 thereby forcing hydraulic oil out of the oil accumulator subchamber 84 and into the ram chamber 44 thereby increasing fluid pressure in the ram chamber 44. Such an increase in fluid pressure urges the recoil ram 40 back to its original position in which the shoulder 50 thereof is urged into contact with the stop surface 58. Moreover, such an increase in fluid pressure also returns the check valve 94 to its open position which allows hydraulic oil to be advanced between the ram chamber 44 and the ram subchamber 62 via the flow channels 108 thereby returning the tensioning ram 42 to its original position.

In order to equalize the fluid pressure between the ram chamber 44 and the ram subchamber 62 in a relatively short period of time during such movement of the recoil ram 40, the valve member 96 has a pressure equalization channel 112 defined therein. The pressure equalization channel 112 enables fluid communication between the ram chamber 44 and the ram subchamber 62 irrespective of the position of the check valve 94. More specifically, the pressure equalization channel 112 allows for a relatively small, restricted flow of hydraulic oil between the ram chamber 44 and the ram subchamber 62 when the check valve 94 is positioned in its closed position in order to facilitate pressure equalization between the ram chamber 44 and the ram subchamber 62. Such pressure equalization is particularly useful to quickly equalize the fluid pressure in the ram chamber 44 and the ram subchamber 62 subsequent to recoil of the recoil ram 40. Moreover, use of the pressure equalization channel 112 also prevents a "ratchet effect" caused by variations in the tension of the track chain 20. In particular, the pressure equalization channel 112 allows the fluid pressure in the ram subchamber 62 to be quickly equalized with the fluid pressure in the ram chamber 44 thereby preventing movement of the recoil ram 40 as a result of minor variations in the tension of the track chain 20.

Industrial Applicability

In operation, during advancement of the work machine, the tensioning ram 42 maintains tension (i.e. removes slack from) the track chain 20. In particular, gas pressure within the gas accumulator subchamber 82 of the accumulator assembly 26 urges the piston 80 in the general direction of arrow 54 of FIG. 2 thereby advancing the hydraulic oil in the oil accumulator subchamber 44 into the ram chamber 84. Presence of fluid pressure of a predetermined magnitude (e.g. 663 psi) causes the ram head 48 and hence the recoil ram 40 to be urged in the general direction of arrow 54 of FIG. 2 such that the shoulder 50 thereof is urged into contact with the stop surface 58.

Presence of fluid pressure of the predetermined magnitude (e.g. 663 psi) also causes the check valve 94 to be positioned in its open position (see FIG. 3) thereby allowing hydraulic oil to be advanced from the ram chamber 44 into the ram subchamber 62 via the flow channels 108. Presence of fluid pressure of the predetermined magnitude (e.g. 663 psi) in the ram subchamber 62 causes the ram head 64 and hence the tensioning ram 42 to be urged in the general direction of arrow 54 of FIG. 2 such that the front idler roller 14 is urged in the general direction of arrow 36 of FIG. 1. It should be appreciated that such urging of the front idler roller 14 tensions (i.e. removes the slack from) the track chain 20 as the same is advanced around the drive sprocket 12, the front idler roller 14, the rear idler roller 16, and the midroller assemblies 18. Moreover, if the slack in the track chain 20 increases thereby reducing the tension of the track chain 20, gas pressure within the gas accumulator subchamber 82 further urges the piston 80 in the general direction of arrow 54 of FIG. 2 thereby further extending the tensioning ram 42 so as to maintain a constant tension on the track chain 20.

However, if a rock or the like is ingested during advancement of the undercarriage assembly 10, the front idler roller 14 is urged or otherwise moved in the general direction of arrow 38 of FIG. 1. Such movement of the front idler roller 14 causes the tensioning ram 42 to be urged in the general direction of arrow 56 of FIG. 2 thereby increasing fluid pressure in the ram subchamber 62. Such an increase in fluid pressure causes the check valve 94 to assume its closed position, as shown in FIG. 4. When positioned in its closed position, the check valve 94 prevents hydraulic oil from advancing between the ram subchamber 62 and the ram chamber 44 via the flow channels 108. Hence, the force being exerted on the front idler roller 14 is transferred to the recoil ram 40. Once such a force is greater in magnitude than the force created by the fluid pressure being exerted on the leading surface 90 of the ram head 48 (e.g. 75,000 pounds), the recoil ram 40 is urged or otherwise moved in the general direction of arrow 56 of FIG. 2 thereby providing relief or slack in the track chain 20. It should be appreciated that such relief in the track chain 20 facilitates expulsion of the rock from the undercarriage assembly 10.

As the recoil ram 40 is urged in the general direction of arrow 56 of FIG. 2, the hydraulic oil in the ram chamber 44 is displaced or otherwise forced into the oil accumulator subchamber 84 thereby increasing fluid pressure therein. Such an increase in fluid pressure urges the piston 80 in the general direction of arrow 56 of FIG. 2 thereby compressing the gas in the gas accumulator subchamber 82. Once the rock has be expelled from the undercarriage assembly 10, gas pressure present in the gas accumulator subchamber 82 urges the piston 80 in the general direction of arrow 54 of FIG. 2 thereby forcing hydraulic oil out of the oil accumulator subchamber 84 and into the ram chamber 44 thereby increasing fluid pressure in the ram chamber 44. Such an increase in fluid pressure urges the recoil ram 40 back to its original position in which the shoulder 50 thereof is urged into contact with the stop surface 58. Moreover, such an increase in fluid pressure also returns the check valve 94 to its open position which allows hydraulic oil to be advanced between the ram chamber 44 and the ram subchamber 62 via the flow channels 108 thereby returning the tensioning ram 42 to its original position in which it tensions (i.e. removes slack from) the track chain 20.

From the above discussion, it should be appreciated that the recoil and slack adjustment mechanism 22 has numerous advantages associated therewith relative to recoil and slack adjustment mechanisms which have heretofore been designed. For example, the recoil and slack adjustment mechanism 22 continuously maintains tension on the track chain 20. In particular, as the slack in the track chain 20 increases over time (i.e. the tension in the track chain decreases), fluid pressure within the ram subchamber 62 further extends the tensioning ram 42 thereby maintaining a continuous, constant tension on the track chain 20. Such continuous, constant tension on the track chain 20 advantageously increases the useful life thereof.

Moreover, the recoil and slack adjustment mechanism 22 maintains tension on the track chain 20 and facilitates expulsion of rocks or the like from the undercarriage assembly 10 without reducing the hydraulic capacity associated with the work machine. In particular, the recoil and slack adjustment mechanism 22 does not require use of "live hydraulics" (i.e. a hydraulic system actively supported by a hydraulic pump) thereby allowing the work machine's hydraulic capacity to be utilized by other components associated with the work machine such as the hydraulic cylinders (not shown) associated with the work machine's blade or ripper assemblies (not shown).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A slack adjustment mechanism for a track of an undercarriage assembly, comprising:

a ram assembly which includes (i) a ram housing defining a ram chamber, said ram housing further having a ram fluid port defined therein, (ii) a first ram positioned within said ram chamber, said first ram defining a ram subchamber, said first ram having a ram opening defined therein so as to enable fluid communication between said ram chamber and said ram subchamber, (iii) a second ram positioned within said ram subchamber, and (iv) a check valve interposed between said ram chamber and said ram subchamber for controlling fluid flow therebetween; and an accumulator assembly which includes (i) an accumulator housing defining an accumulator chamber, said accumulator housing further having an accumulator fluid port defined therein, said accumulator fluid port being positioned relative to said ram fluid port so that said ram chamber is in fluid communication with said accumulator chamber, (ii) an accumulator piston positioned within said accumulator chamber so as to divide said accumulator housing into a first accumulator subchamber and a second accumulator subchamber, (iii) a gas positioned within said first accumulator subchamber, and (iv) a fluid positioned within said second accumulator subchamber.

2. The mechanism of claim 1, wherein:

said undercarriage assembly includes a first idler roller, a second idler roller, and a drive sprocket, said track is entrained about said first idler roller, said second idler roller, and said drive sprocket, and said ram assembly and said accumulator assembly cooperate so as to adjust spacing between the first idler roller and the second idler roller.

3. The mechanism of claim 1, wherein:

said check valve is positionable in an open position when subjected to a first force in a first direction, said check valve is positionable in a closed position when subjected to a second force in a second direction, and said second force is greater than said first force.

4. The mechanism of claim 3, wherein said check valve is positionable in said open position when subjected to a third force in a second direction which is opposite of said first direction.

5. The mechanism of claim 3, wherein:

said check valve includes a valve member, said valve member includes a pressure equalization channel, and said check valve allows fluid to pass between said ram chamber and said ram subchamber through said pressure equalization channel when said check valve is positioned in either said open position or said closed position.

6. The mechanism of claim 5, wherein:

said check valve includes a flow channel, said check valve allows fluid to pass between said ram chamber and said ram subchamber through said flow channel when said check valve is positioned in said open position, and said check valve prevents fluid from passing between said ram chamber and said ram subchamber through said flow channel when said check valve is positioned in said closed position.

7. The mechanism of claim 1, wherein said second accumulator subchamber is in fluid communication with said ram chamber.

8. The mechanism of claim 1, wherein said fluid includes hydraulic oil.

9. The mechanism of claim 1, further comprising a ram stop positioned within said ram chamber, wherein:

said ram chamber has a first chamber end and a second chamber end, and said stop is secured to an interior sidewall of said ram housing at a location which is interposed between said first chamber end and said second chamber end so as to limit linear travel of said first ram.

10. The mechanism of claim 1, wherein:

movement of said first ram within said ram chamber causes movement of said accumulator piston within said accumulator housing.

11. The mechanism of claim 1, wherein:

movement of said second ram relative to said first ram within said ram subchamber causes movement of said accumulator piston within said accumulator housing.

12. The mechanism of claim 1, wherein:

said first ram includes a first ram head having a first ram leading surface defined thereon which contacts fluid within said ram chamber, said second ram includes a second ram head having a second ram leading surface defined thereon which contacts fluid within said ram subchamber, and said first ram leading surface is larger than said second ram leading surface.

13. A slack adjustment mechanism for a track of an undercarriage assembly, comprising:

a ram assembly which includes (i) a ram housing defining a ram chamber, said ram housing further having a ram fluid port defined therein, (ii) a first ram positioned within said ram chamber, said first ram defining a ram subchamber, said first ram having (A) a ram opening defined therein so as to enable fluid communication between said ram chamber and said ram subchamber, and (B) a first ram head having a first ram leading surface defined thereon which contacts fluid within said ram chamber, (iii) a second ram positioned within said ram subchamber, said second ram includes a second ram head having a second ram leading surface defined thereon which contacts fluid within said ram subchamber, said first ram leading surface is larger than said second ram leading surface, and (iv) a check valve interposed between said ram chamber and said ram subchamber for controlling fluid flow therebetween; and an accumulator assembly which includes (i) an accumulator housing defining an accumulator chamber, said accumulator housing further having an accumulator fluid port defined therein, said accumulator fluid port being positioned relative to said ram fluid port so that said ram chamber is in fluid communication with said accumulator chamber, (ii) an accumulator piston positioned within said accumulator chamber so as to divide said accumulator housing into a first accumulator subchamber and a second accumulator subchamber, (iii) a gas positioned within said first accumulator subchamber, and (iv) a fluid positioned within said second accumulator subchamber, wherein (i) said undercarriage assembly includes a first idler roller, a second idler roller, and a drive sprocket, (ii) said track is entrained about said first idler roller, said second idler roller, and said drive sprocket, and (iii) said ram assembly and said accumulator assembly cooperate so as to adjust spacing between the first idler roller and the second idler roller.

14. The mechanism of claim 13, wherein:

said check valve is positionable in an open position when subjected to a first force in a first direction, said check valve is positionable in a closed position when subjected to a second force in a second direction, and said second force is greater than said first force.

15. The mechanism of claim 14, wherein said check valve is positionable in said open position when subjected to a third force in a second direction which is opposite of said first direction.

16. The mechanism of claim 14, wherein:

said check valve includes a valve member, said valve member includes a pressure equalization channel, and said check valve allows fluid to pass between said ram chamber and said ram subchamber through said pressure equalization channel when said check valve is positioned in either said open position or said closed position.

17. The mechanism of claim 16, wherein:

said check valve includes a flow channel, said check valve allows fluid to pass between said ram chamber and said ram subchamber through said flow channel when said check valve is positioned in said open position, and said check valve prevents fluid from passing between said ram chamber and said ram subchamber through said flow channel when said check valve is positioned in said closed position.

18. The mechanism of claim 13, wherein said second accumulator subchamber is in fluid communication with said ram chamber.

19. The mechanism of claim 13, further comprising a ram stop positioned within said ram chamber, wherein:

said ram chamber has a first chamber end and a second chamber end, and said stop is secured to an interior sidewall of said ram housing at a location which is interposed between said first chamber end and said second chamber end so as to limit linear travel of said first ram.

20. The mechanism of claim 13, wherein:

movement of said first ram within said ram chamber causes movement of said accumulator piston within said accumulator housing, and movement of said second ram relative to said first ram within said ram subchamber causes movement of said accumulator piston within said accumulator housing.

\* \* \* \* \*